United States Patent [19]

Midgley et al.

[11] Patent Number: 4,803,240

[45] Date of Patent: Feb. 7, 1989

[54] STYRENE GRAFTED ISOPRENE PSA'S

[75] Inventors: Charles A. Midgley, Hixson, Tenn.; Orest N. Chick, Sarnia, Canada

[73] Assignee: BASF Corporation, Parsippany, N.J.

[21] Appl. No.: 129,166

[22] Filed: Dec. 7, 1987

[51] Int. Cl.$^4$ .............................................. C08J 0/00
[52] U.S. Cl. ................................... 524/504; 524/523; 524/525; 524/526
[58] Field of Search ................ 524/504, 525, 526, 523

[56] References Cited

U.S. PATENT DOCUMENTS

| | | | |
|---|---|---|---|
| 3,412,061 | 11/1968 | Drukker | 524/525 |
| 4,038,346 | 7/1977 | Feeney | 524/525 |
| 4,147,831 | 4/1979 | Balinth | 524/525 |
| 4,157,319 | 6/1979 | Feeney et al. | 524/504 |
| 4,179,415 | 12/1979 | Bemmels | 524/389 |
| 4,191,799 | 3/1980 | Gruber | 524/504 |
| 4,284,541 | 8/1981 | Takeda et al. | 524/504 |
| 4,313,986 | 2/1982 | Magnotta | 524/525 |
| 4,355,131 | 10/1982 | Wise | 524/504 |
| 4,359,547 | 11/1982 | Agarwal et al. | 524/504 |
| 4,409,343 | 10/1983 | Wise | 524/504 |
| 4,412,017 | 10/1983 | Van Eenam | 524/525 |
| 4,670,504 | 6/1987 | Cardenas | 524/504 |

FOREIGN PATENT DOCUMENTS 0080330  6/1975  Japan ................................... 524/504

OTHER PUBLICATIONS

Chemical Abstracts, vol. 98, 1983, No. 98:55321j, "Effect of Styrene Grafting on Rheological Properties of Latex & Polymer Compositions of Cis-Polyisoprene".

Primary Examiner—Joseph L. Schofer
Assistant Examiner—J. M. Reddick
Attorney, Agent, or Firm—Bruce E. Harang

[57] ABSTRACT

The properties of an adhesive are a function of its adhesive or tacky properties and its cohesive or internal strength properties. Generally, varying the polymer properties to increase the cohesive strength of the adhesive will lower the tack of the adhesive. An improvement in both the cohesive and adhesive properties of an adhesive comprising a polymer and a tackifier by using a polymer which comprises a plastic grafted onto an elastomer; and a tackifier which is more compatible in the elastomer.

4 Claims, No Drawings

STYRENE GRAFTED ISOPRENE PSA'S

FIELD OF THE INVENTION

The present invention relates to aqueous based pressure sensitive adhesives. More particularly, the present invention relates to aqueous based pressure sensitive adhesives based on latices of polymers of isoprene, which may be carboxylated and which have been grafted with styrene. Such adhesives contain a tackifier which is soluble in polyisoprene.

BACKGROUND OF THE INVENTION

Chemical Abstract 98:55321j of Nov. Reol.Polim. Mater Vses; Simp Reol 11th (USSR) discloses that it is known to graft styrene onto polyisoprene. The abstract does not suggest any commercial use for the resulting polymer.

U.S. Pat. No. 4,179,415 issued Dec. 18, 1979 to Bemmels, assigned to Johnson & Johnson discloses an aqueous based adhesive composition based on latices of polyisoprene, copolymers of butadiene and isoprene, and natural rubber. The tackifier is added as a solution in an organic solvent. Thus, the adhesives of Bemmels are not solvent free. More importantly, such adhesives have a low shear value. Attempts to increase the cohesive strength of the adhesive by increasing the gel content of the polymer tends to result in low tack. In short, there is a properties limitation for latices of random polymers. Applicant has discovered that some of these deficiencies may be overcome by grafting a thermoplastic onto a polyisoprene base polymer.

SUMMARY OF THE INVENTION

The present invention provides an aqueous based pressure sensitive adhesive comprising per 100 parts by dry weight of a latex of a graft polymer consisting of:

(a) from 70 to 95 weight % of an elastomer in which from 40 to 80 weight percent of the elastomer is soluble in tetrahydrofuran and the soluble portion of the elastomer has a median molecular weight from $10^3$ to $10^5$; and (b) from 30 to 5 weight % of a grafted thermoplastic having a Tg from 35° C. to 120° C. and which is thermodynamically incompatible with the elastomer from about 20 to 250 parts by dry weight of a tackifier resin which is more soluble in the elastomer, and less soluble in the thermoplastic. The present invention also provides adherends coated with such adhesives.

DETAILED DESCRIPTION OF THE INVENTION

Without wishing to be bound by theory, applicant believes the thermoplastic part of the graft polymer acts as a labile thermoplastic cross-linking agent. It is believed that if the tackifier resin were soluble in the thermoplastic, it would not provide so great an improvement in the adhesive properties. In a preferred aspect of the present invention the elastomer comprises: at least 85 weight percent of one or more monomers selected from the group consisting of isoprene and chloroprene, mosts preferably isoprene; up to 15 weight percent of a monomer selected from the group consisting of $C_{1-8}$ alkyl or hydroxyalkyl esters of a $C_{3-8}$ ethylenically unsaturated carboxylic acid and up to 5, preferably 1 to 25, weight percent of one or more monomers selected from the group consisting of: (i) $C_{3-6}$ ethylenically unsaturated carboxylic acids; (ii) $C_3$-6 ethylenically unsaturated aldehydes; and (iii) amides of $C_{3-6}$ ethylenically unsaturated carboxylic acids, which amides may be unsubstituted or substituted at the nitrogen atom by up to two radicals selected from the group consisting of $C_{1-4}$ alkyl and hydroxyalkyl radicals. Suitable $C_{3-6}$ ethylenically unsaturated acids comprise acrylic acid, methacrylic acid, itaconic acid and fumaric acid.

Acrolein is included in suitable $C_{3-6}$ ethylenically unsaturated aldehydes. Useful $C_{2-8}$ alkyl and hydroxyalkyl esters of $C_{3-6}$ ethylenically unsaturated carboxylic acids include ethyl butyl, hydroxyethyl, and ethylhexyl acrylate and methacrylate. Useful amides of $C_{3-6}$ ethylenically unsaturated carboxylic acids include acrylamide, methacrylamide and N-methyhol acrylamide. Most preferably, the elastomer comprises at least 95 weight percent of isoprene and up to 5 weight percent of one or more monomers selected from the group consisting of acrylic acid, methacrylic acid, itaconic acid and fumaric acid.

The elastomer should be such that from 40 to 80, preferably 50 to 70 percent of the elastomer is soluble in tetrahydrofuran (THF). The median molecular weight of the portion of the elastomer soluble in THF should be from $10^3$ to $10^5$ most preferably from $10^4$ to $10^{4.7}$. The methods for determining molecular weight are well known in the art. The preferred method is to measure the time it takes for a solution of polymer in THF or some other suitable solvent to pass through a chromatographic column. The methods of controlling the molecular weight distribution of an emulsion polymer are also well known as discussed in U.S. Pat. Nos. 4,508,864 and 4,540,739 assigned to Polysar Limited, the disclosures of which are hereby incorporated by reference. The elastomer should have a Tg of less than $-30°$ C., preferably from $-80°$ to $-35°$ C. The thermoplastic must be thermodynamically incompatible with the elastomer. This means that the elastomer and the thermoplastic will tend to be, and most preferably are, separate phases. The thermoplastic graft portion of the polymer is a polymer having a Tg from 35 to 120, preferably from 50° to 110° C. The thermoplastic polymer may be a co- or homo polymer of one or more monomers from the group consisting of $C_{8-12}$ vinyl or vinyldene aromatic monomers which may be unsubstituted or substituted by a $C_{1-4}$ alkyl radical, $C_{1-2}$ alkyl acrylates and $C_{1-2}$ alkyl methacrylates. Polystyrene is a particularly useful thermoplastic.

The ratio of graft thermoplastic to elastomer may range from 30:70 to 5:95. Most preferably the thermoplastic:elastomer ratio is from 20:80 to 10:90. In addition to the latex of the graft polymer, the adhesive compositions of the present invention comprise a tackifier resin. The tackifier should be more soluble in the elastomeric part of the polymer and less soluble in the thermoplastic part of the polymer. Suitable tackifiers include those produced from the $C_5$ cut of a stream of aliphatic hydrocarbons. Such tackifiers include terpene resins, pinene resins, piperylene, and isoprene tackifiers.

The tackifier may be present in an amount from 20 to 250, preferably 50 to 150 parts by weight per 100 parts by weight of polymer. The tackifier resin may be added to the latex as an aqueous dispersion or emulsion, or it may be added as a melt. Preferably, it is added as an aqueous dispersion.

The adhesives of the present invention are particularly useful in pressure sensitive adhesives. Generally, the adhesive is applied to a substrate at a dry coat weight from 6 to 68.0 gm/m² (0.2 to 2 oz/yd²). (The web or sheet is then slit or punched to the required width and/or dimension.)

The substrate may be a woven or non woven web or sheet, an extruded sheet, or a foil. The woven or non woven may be made from natural cellulose fiber such as cotton, jute, etc. or a natural amide (protein) type fiber such as wool. The woven or non woven may be made from synthetic fibers such as polyester, polyamide or aramide fibers. The substrate may be a thin metal foil such as aluminum.

The web may be an extruded sheet up to about ⅛" thick of a polyolefin such as ethylene or propylene or a polymer such as poly vinyl chloride, polyvinylidene chloride or polyterephthalate resin. The web may be a non woven web saturated with a polymeric binder such as a styrene butadiene type or an acrylic type of polymer. This is particularly useful where it is desired to prevent the tackifier from diffusing down into the web, as may occur in masking tape or lables if the tackifier is soluble in the polymer which binds the base web. Suitable fibers for the non woven web include cellulosefibers, which may be untreated, such as wood pulp or regenerated cellulose such as rayon, polyesters, poly acrylates, poly amides such as nylon and the like.

The following examples are intended to illustrate the invention and not to limit it. In the examples unless otherwise specified, the parts are parts by dry weight.

EXAMPLE 1

A series of latices of polymers were either purchased or prepared.

The following polymers were used:
A: natural rubber commercially available as Hartex (trademark) 103.
B: styrene: isoprene: itaconic acid 25:73:2 random copolymer
C: acrylonitrile: isoprene 25:73 random copolymer
D: isoprene: itaconic acid 98:2
E: polyisoprene
F: polyisoprene with grafted styrene 90:10
G: polyisoprene
H: polyisoprene with grafted styrene 90:10

The latices were tackified with an emulsion of a polyterpene resin (beta pinene) sold under the trademark PICCOLYTE S-90. The amount of tackifer and polymer are indicated in the table.

The resulting adhesive was drawn down on a Mylar (Trademark) film at a dry coat weight of 25 g/m² (0.7 oz/yd²) and the films were dried at 115° C. for 3 minutes resulting in a psa coating 25 microns thick. The resulting adhesive were then tested using standard Pressure Sensitive Tape Council (PSTC) tests (7th edition). The results are set forth in Table I.

TABLE I

| | Polymer Type | | | | | | | | | | | | | | | | |
|---|---|---|---|---|---|---|---|---|---|---|---|---|---|---|---|---|---|
| | A | | | B | | | | C | | | D | | E | F | G | H |
| Parts (dry wt.) | 100 | 100 | 100 | 100 | 100 | 100 | 100 | 100 | 100 | 100 | 100 | 100 | 100 | 100 | 100 | 100 |
| PICCOLYTE S-90 (Parts dry wt.) | 100 | 120 | 150 | 0 | 40 | 80 | 120 | 0 | 30 | 70 | 0 | 50 | 50 | 50 | 50 | 50 |
| 180° Peel (stainless steel) gm cm⁻¹ | 328 | 475 | 606 | 461 | 556 | 623 | 496 | 247 | 114 | 119 | 116 | 614 | 537 | 485 | 564 | 452 |
| 90° Quick Stick (stainless steel) gm cm⁻¹ | 245 | 319 | 415 | 247 | 91 | 67 | 12 | 92 | 28 | 23 | 175 | 704 | 313 | 440 | 341 | 434 |
| Shear Adhesion 2.5 m × 1.25 m hours | 40 | 43 | 81 | 136 | 36 | 44 | 99 | 18.3 | 70 | 243 | 0.1 | 3.0 | 7.5 | 137.8 | 121 | 137.8 |

Table I illustrates a number of points:
(1) The desire to improve the shear of natural rubber/tackifier blends (col. A).
(2) The desire to improve the shear of carboxylated poly isoprene/tackifier blends (col. D).
(3) Random polymers of styrene, isoprene and itaconic acid gives excellent shear but inadequate tack properties (col. B)
(4) Random polymers of acylonitrile and isoprene share good shear properties, but inadequate tack propterties (col. C).
(5) The Polyisoprene grafted with 10 percent styrene may be compounded with tackifiers to obtain acceptable tack and shear properties.

What is claimed is:
1. An aqueous based pressure sensitive adhesive, which does not contain an organic solvent or diluent comprising per 100 parts by dry weight of a latex of an elastomeric polymer onto which has been grafted a thermoplastic polymer consisting of:
(A) from 70 to 95 weight percent of an elastomer comprising
 (i) at least 85 weight percent of isoprene or chloroprene;
 (ii) up to 15 weight percent of one or more monomers selected from the group consisting of $C_{1-8}$ alykl and hydroxyalkyl esters of $C_{3-6}$ ethylenically unsaturated carboxylic acids; and
 (iii) up to 5 weight percent of one or more monomers selected from the group consisting of
  (a) $C_{3-6}$ ethylenically unsaturated carboxylic acid monomers;
  (b) $C_{3-6}$ ethylenically unsaturated aldehydes; and
  (c) amides of $C_{3-6}$ ethylenically unsaturated carboxylic acids, which amides may be unsubstituted or substituted at the nitrogen atom by up to two radicals selected from the group consisting of $C_{1-4}$ alkyl and hydroxyalkyl radicals; from 40 to 80 weight percent of said elastomer being soluble in tetrahydrofuran and the tetrahydrofuran soluble portion of the elastomer having a median molecular weight from $10^3$ to $10^5$; and
(B) from 30 to 5 weight percent of a grafted thermoplastic having Tg from 35° C. to 120° C. and which is a polymer of one or more monomers selected from the group consisting of $C_{8-12}$ vinyl or vinylidene aromatic monomers which may be unsubstituted or substituted by a $C_{1-4}$ alkyl radical and $C_{1-2}$ alkyl esters of acrylic and methacrylic acid;

from about 20 to 250 parts by dry weight of an aqueous emulsion of a tackifier resin which is selected from the group consisting of terpene resins, pinene resins, piperylene resins, and isoprene tackifiers.

2. An adhesive according to claim 1 wherein said tackifier is a $C_5$ hydrocarbon tackifier resin and is present in an amount from 50 to 150 parts by weight per 100 parts by weight of polymer.

3. An adhesive according to claim 2 wherein said polymer comprises 70 to 95 weight percent of said elastomer which comprises at least 95 weight percent of isoprene and up to 5 weight percent of one or more monomers selected from the group consisting of acrylic acid, methacrylic acid, itaconic acid and fumaric and from 30 to 5 weight percent of said thermoplastic which comprises polystyrene.

4. An adhesive according to claim 3, wherein the portion of said elastomer soluble in tetrahydrofuran is from 50 to 70 weight percent and the median molecular weight of said elastomer soluble in tetrahydrofuran is from $10^4$ to $10^{4.7}$.

* * * * *